United States Patent [19]
Nilsson

[11] Patent Number: 5,265,339
[45] Date of Patent: Nov. 30, 1993

[54] CABLE STRIPPING TOOL

[75] Inventor: Mikael Nilsson, Alvdalen, Sweden

[73] Assignee: Pressmaster Tool AB, Alvdalen, Sweden

[21] Appl. No.: 849,381

[22] Filed: May 8, 1992

[51] Int. Cl.$^5$ .............................................. B21F 13/00
[52] U.S. Cl. ..................................... 30/91.1; 30/91.2; 30/90.1; 30/90.8
[58] Field of Search ...................... 30/91.1, 91.2, 90.1, 30/90.8

[56] References Cited

U.S. PATENT DOCUMENTS

| | | | |
|---|---|---|---|
| 3,215,007 | 11/1965 | Stallings | 30/91.1 |
| 3,309,768 | 3/1967 | Thompson | 30/91.1 |
| 3,914,864 | 10/1975 | Prince | 30/91.1 |
| 4,081,871 | 4/1978 | Knuth | 30/91.1 |
| 5,009,006 | 4/1991 | Sawyer et al. | 30/91.1 |

Primary Examiner—Douglas D. Watts
Assistant Examiner—Paul M. Heyrana, Sr.
Attorney, Agent, or Firm—Keck, Mahin & Cate

[57] ABSTRACT

A cable stripping tool is set forth of the kind that includes a first and a second leg, the first leg is provided with a fitting for at least one cutter, optionally fitted in a removable cutter cassette, and of which the second leg is provided opposite the fitting with a seating for receiving a cable from which insulation is to be removed and for supporting the cable in a position at right angles to said cutter, the legs being pivotable relative to one another in a longitudinally extending central plane containing both of the legs against the action of a resiliently flexible or bendable spring device which mutually connects said legs and which is operative to resiliently bias the legs towards a working position in which a cable positioned in the seating is resiliently pressed against the cutter or cutters in the fitting.

8 Claims, 1 Drawing Sheet

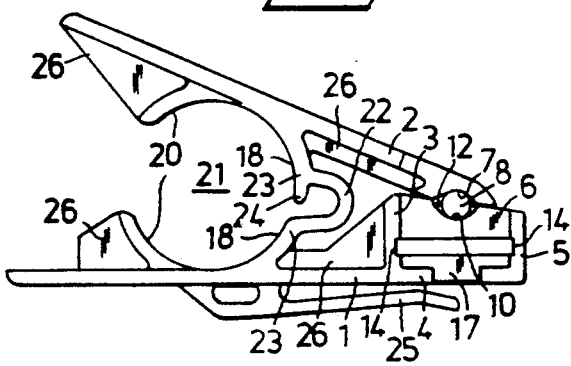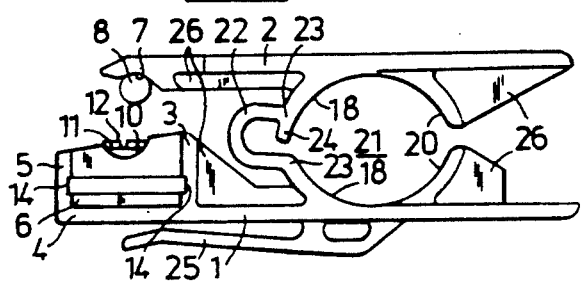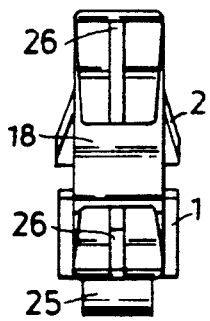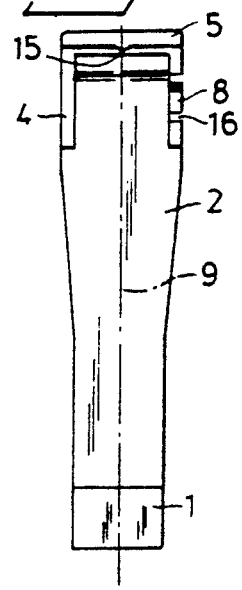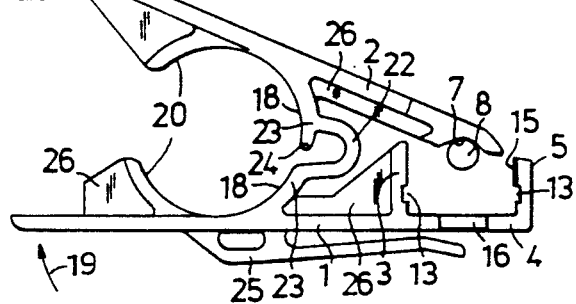

CABLE STRIPPING TOOL

The present invention relates to a cable stripping tool of the kind which includes a first and a second leg of which the first leg is provided with a fitting for at least one cutter, optionally fitted in a removable cutter cassette, and of which the second leg is provided opposite the fitting with a seating for receiving a cable from which insulation is to be removed and for supporting the cable in a position at right angles to said cutter, said legs being pivotable relative to one another in a longitudinally extending central plane containing both of said legs against the action of a resiliently flexible or bendable spring device which mutually connects said legs and which is operative to resiliently bias the legs towards a working position in which a cable positioned in the seating is resiliently pressed against the cutter or cutters in the fitting.

A cable stripping tool which comprises two pivotal legs which are spring biased towards a working position is known, for instance, from U.S. Pat. No. 3,914,864.

The object of the present invention is to provide a novel and advantageous cable stripping tool of particularly simple construction therewith enabling the tool to be manufactured readily at low cost.

To this end, it is proposed in accordance with the invention that the resilient device of a cable stripping tool of this kind comprises an arcuate bridge which extends between both of said legs, perpendicularly to the central plane, and which is convex preferably towards the fitting and the seating, and that said bridge, together with further arcuate regions of the legs forms, in the working position of the tool, a substantially closed, transversely extending finger-accommodating opening which facilitates rotation of the tool around a cable from which insulation is to be removed. This results in a maximum simplification of tool construction while retaining satisfactory operation of the tool and affording considerable technical and economical advantages.

Other characteristic features of the invention and advantages afforded thereby will be evident from the depending claims and from the following description of a selected, exemplifying embodiment of the inventive cable stripping tool illustrated in the accompanying drawing.

FIG. 1 is a side view of an inventive cable stripping tool with the tool in a neutral state.

FIG. 2 is a side view of the tool taken from the opposite side of the FIG. 1 illustration and shows the legs pivoted to a position for receiving a cable from which insulation is to be removed, between the seating and a cutter cassette.

FIG. 3 is a rear view of the tool shown in FIG. 1.

FIG. 4 is a top view of the tool shown in FIG. 1, with the cutter cassette removed.

FIG. 5 is a side view of the tool corresponding to FIG. 1, but with the cutter cassette removed.

In the Figures of the accompanying drawing mutually corresponding tool components are identified with the same reference signs. The drawing illustrates a cable stripping tool which comprises a first and a second leg 1, 2. As will best be seen from FIG. 5, one end of the first leg 1 has formed thereon a fitting for receiving a cutter cassette 6, which is shown inserted into the tool in the FIG. 1 and 2 illustrations. The fitting is defined by wall parts 3–5 and is open along the sides and the top thereof. The second leg 2 is provided opposite the fitting 3–5 and the cassette 6 with a downwardly open, groove-shaped seating 7 for receiving, e.g., a coaxial cable. The leg 2 is configured at one end of the groove with an abutment 8 intended for contact with said cable end such as to localize the cable in relation to the seating 7 and the cassette 6. The legs 1, 2 are pivotal relative to one another in a longitudinally extending central plane 9 which includes both of said legs, said plane being shown by a chain line in FIG. 4. The wall parts 3–5 and the groove-shaped seating 7 extend perpendicularly to the plane 9. Formed in the sloping upper side of the cassette 6 is a further cable receiving groove 10, which also extends perpendicularly to the plane 9. The cassette 6 has mounted therein knives 11, 12 which extend parallel with the plane 9 and which project into the groove 10 to an extent such as to enable a cable placed between the seating 7 and the cassette 6 to be cut to a desired depth upon rotation of the tool around the cable. The upstanding wall parts 3 and 5 of the cassette fitting are provided with horizontal guide grooves 13 which are intended to receive corresponding strips 14 on the sides of the cassette, such as to guide and removably retain the cassette 6 in said fitting 3–5. Located centrally on the wall part 5 is a vertical ridge 15 which is intended to be snapped into a corresponding vertical recess (not shown) in the cassette 6. Finally, the wall part 4 is provided on the side of the leg 2 opposite the abutment 8, with a rectangular recess which is intended to receive a corresponding, downwardly extending projection 17 on the cassette 6.

The tool legs 1, 2 are connected to a respective end of a resilient bridges, generally reference 18. The legs are connected together by said bridge and can be pivoted relative to one another in the longitudinal central plane 9, by bending or flexing the bridge 18. The legs 1, 2 extend both forwardly and rearwardly from the bridge 18, wherein the forward leg parts carry the fitting 3–5 and the seating 7 and can be swung apart from a starting or neutral position, shown in FIG. 5, to the position shown in FIG. 2 for instance, by manually manipulating the rear leg parts in the direction of the arrows 19 in FIG. 5. The rearward leg parts 1, 2 can be extended substantially from the bridge 18, so as to facilitate opening of the tool. Because of the inherent spring characteristics of the bridge, the bridge 18 will constantly strive to move the legs 1, 2 to said neutral position. When a cable is placed between the seating 7 and a cutter fitted in the fitting 3–5, the bridge 18 will be so curved as to cause the seating and the cutter to be urged resiliently towards one another, as a result of said spring characteristics of the bridge.

When seen in the cross-direction of the tool, the bridge 18 extends arcuately between the legs 1, 2 and perpendicularly to the plane 9, thereby enabling a considerable length of spring to be achieved with a small distance between the legs. In the illustrated embodiment, the arcuate bridge 18 is forwardly convex, i.e. is convex towards the fitting 3–5 and the seating 7, and forms together with further arcuate regions 20 of the legs 1, 2 in the working position of the tool (a position in which the legs 1, 2 are pivoted between the positions illustrated in FIGS. 1 and 2) a substantially closed, transverse finger-accommodating opening 21. Thus, when using the tool the legs 1, 2 are swung to the position shown in FIG. 2 and a cable is inserted into the cable seating 7 until the end of the cable abuts the abutment 8. The legs 1, 2 are then allowed to spring back, such that the seating 7 presses the cable against the cutters 11, 12, whereafter a finger is inserted into the opening 21 and the tool is rotated around the cable until the cable insulation has been cut through. The cable is then withdrawn from the seating, while the seating is held pressed against the cutters, so that the severed insulation is withdrawn from the remainder of the cable.

In order to further improve the spring characteristics of the bridge 18, the arcuate extension of the resilient bridge 18 between the legs 1, 2 may be interrupted, in the illustrated manner, by a substantially U-shaped loop part 22 which extends outwardly from the convex side of the bridge 18, so as not to obstruct the opening 21. The loop part 22 presents legs which connect to the bridge 18 at connecting points 23. In order to prevent the opening of the loop part 22 towards the finger-accommodating opening 21 from becoming too wide, such as to feel uncomfortable when rotating the tool around the cable, the bridge 18 may be extended slightly beyond the connecting location between the bridge and at least one of the legs of the loop part, as illustrated at 24.

The tool can be hung, for instance, from a tool belt with the aid of a spring tongue 25 attached to the outer surface of a leg 1.

With the exception of the cutter cassette 6, the illustrated tool consists of one single moulded plastic detail. For the purpose of facilitating mould construction, this plastic detail is constructed substantially exclusively of wall-like parts which are disposed perpendicularly to the central plane 9 and which all preferably have substantially the same thickness and, when so desired, are reinforced with the aid of stiffening ribs 26 disposed in said centre plane.

It will be understood that the invention is not restricted to the aforedescribed and illustrated exemplifying embodiment thereof. For instance, the exchangeable cutter cassette 6 may be omitted and a leg 1 may be provided with a fitting for accommodating the cutters 11, 12 directly. The bridge 18 may consist of or be provided with a reinforcing insert of material of a different kind than that of the legs 1, 2, and the bridge may be arcuately curved in a direction away from the seat 7 and the fitting 3-5.

It will therefore be understood that the invention can be realized in any desired manner within the scope of the inventive concept defined in the following claims.

I claim:

1. A cable stripping tool having a first and a second leg (1, 2) of which the first leg (1) is provided with a fitting (3-5) for at least one cutter (11, 12), optionally fitted in a removable cutter cassette (6), and of which the second leg (2) is provided opposite the fitting with a seating (7) for receiving a cable from which insulation is to be removed and for supporting the cable in a position perpendicular to said cutter (11, 12), said legs being pivotable relative to one another in a longitudinally extending central plane (9) containing both of said legs against the action of a resiliently flexible or bendable spring device (18) which mutually connects said legs and which is operative to resiliently bias the legs (1, 2) towards a working position in which a cable positioned in the seating (7) is resiliently pressed against the cutter or cutters in the fitting (3-5), characterized in that the resilient device (18) comprises an arcuate bridge which extends between both of said legs (1, 2), perpendicularly to said central plane (9), and in that said bridge, together with further arcuate regions (20) of the legs (1, 2), forms, in the working position of the tool, a substantially closed, transversely extending finger-accommodating opening (21) which facilitated rotation of the tool around a cable from which insulation is to be removed.

2. A tool according to claim 1, characterized in that the arcuate extension of the bridge (18) is interrupted at a location approximately centrally between the legs (1, 2) by a substantially U-shaped loop part (22) which extends outwardly from the convex side of the bridge.

3. A tool according to claim 2, characterized in that the opening of the substantially U-shaped loop part (22) facing towards the finger-accommodating opening (21) is partially closed by virtue of the fact that the bridge (18) extends slightly beyond the connecting location (23) between said bridge and at least one of the legs of said loop part.

4. A tool according to claim 1, characterized in that the arcuate bridge (18) is convex in a direction towards the fitting (3-5) and the seating (7).

5. A tool according to claim 1, characterized in that the legs (1, 2) extend rearwardly from the bridge through a substantial distance.

6. A tool according to claim 1, characterized in that one of the legs (1, 2) has provided on its outer surface a longitudinal resilient tongue (25) by means of which the tool can be hung.

7. A tool according to claim 1, characterized in that said tool consists of one single moulded plastic detail, with the exception of the optional removable cutter cassette (6).

8. A tool according to claim 7, characterized in that said plastic detail is constructed essentially of wall-like parts disposed perpendicularly to the central plane (9), and by stiffening ribs (26) disposed in said central plane.

* * * * *